Figure 3:
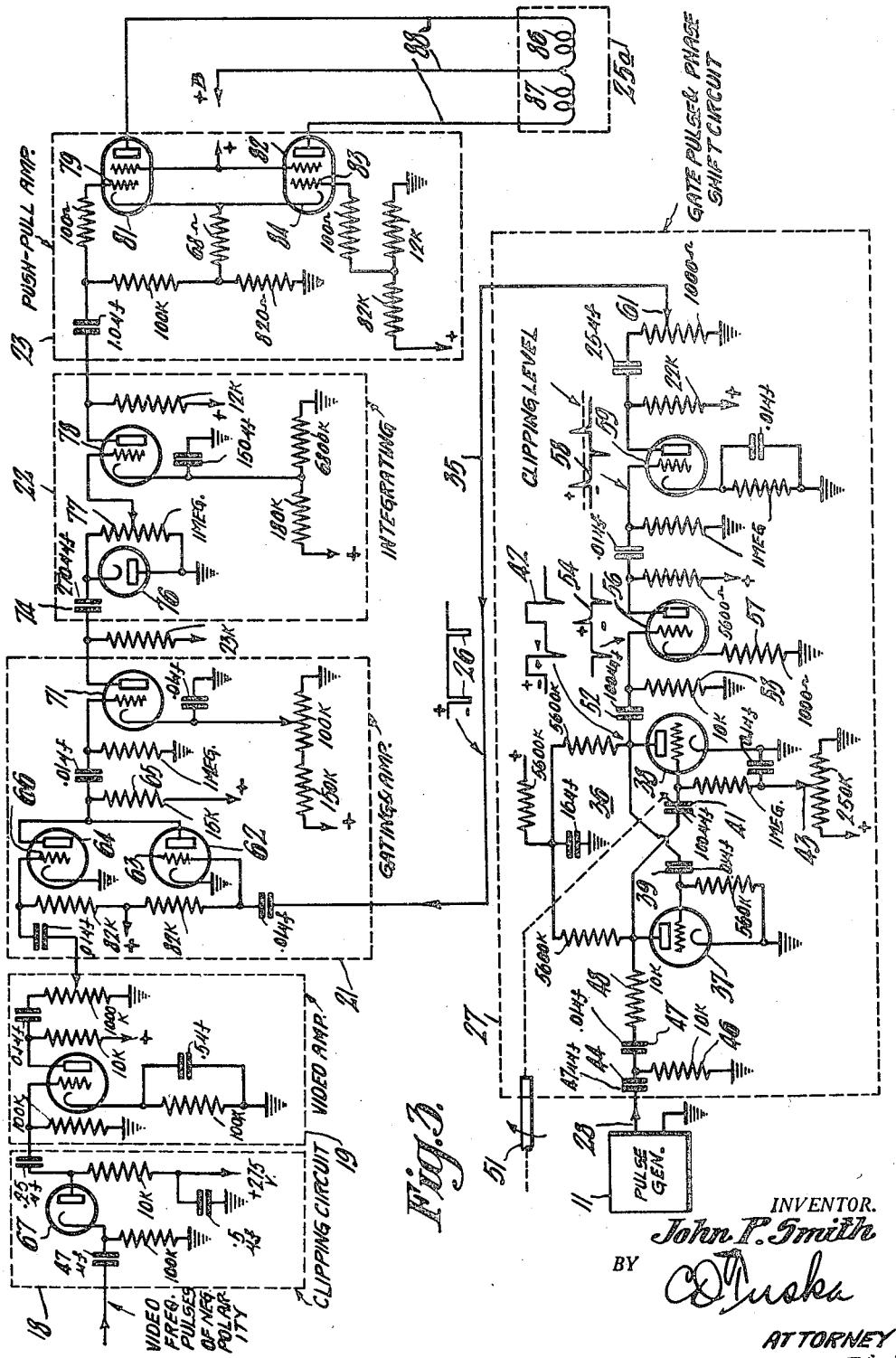

Dec. 20, 1949     J. P. SMITH     2,492,120
RADIO DIRECTION AND RANGING SYSTEM
Filed April 23, 1945     4 Sheets-Sheet 1
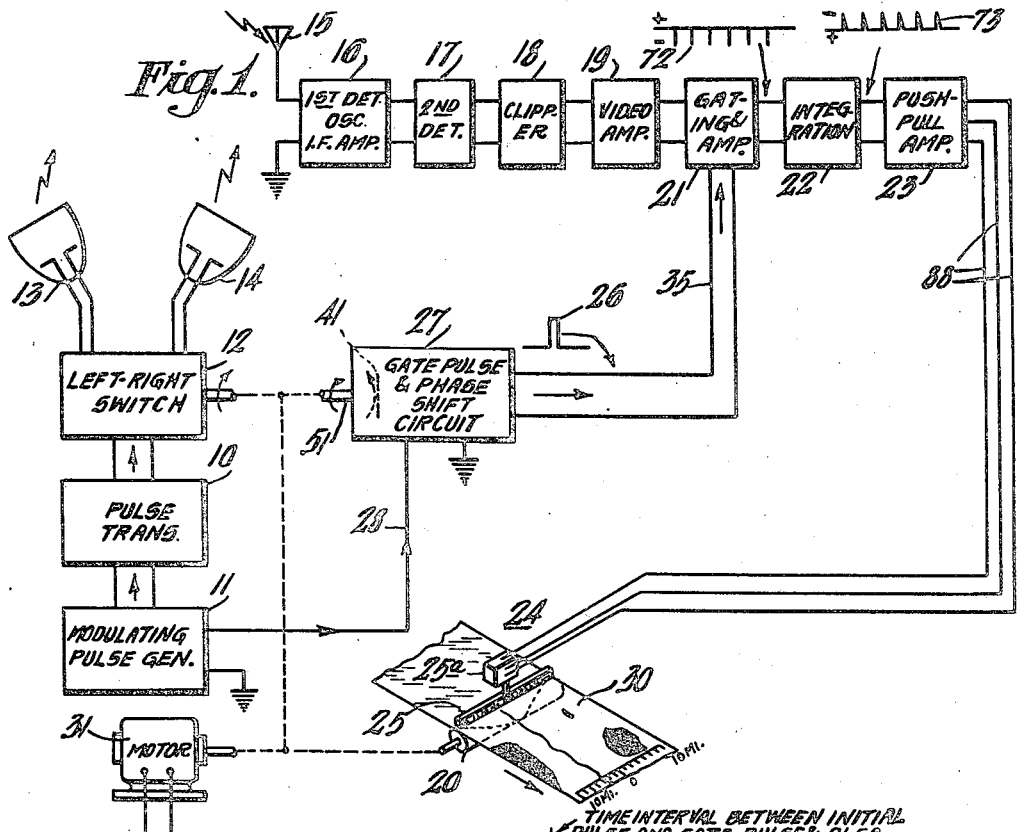
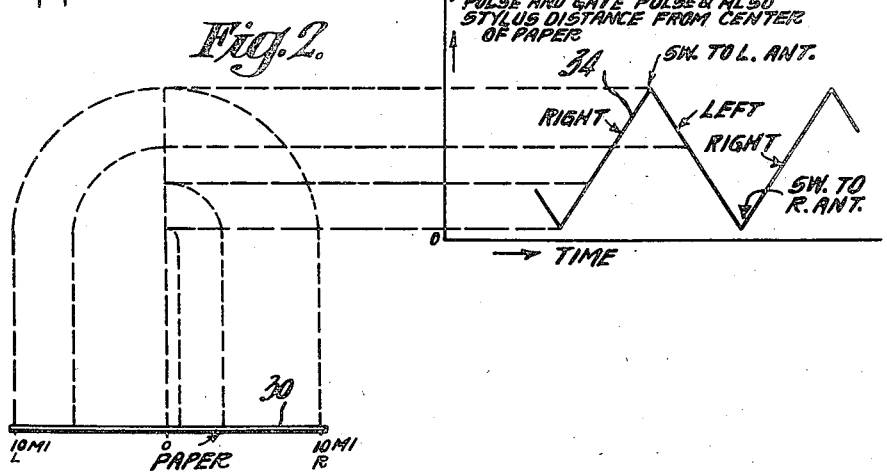
INVENTOR.
John P. Smith
BY
ATTORNEY Dec. 20, 1949  J. P. SMITH  2,492,120
RADIO DIRECTION AND RANGING SYSTEM
Filed April 23, 1945  4 Sheets-Sheet 3
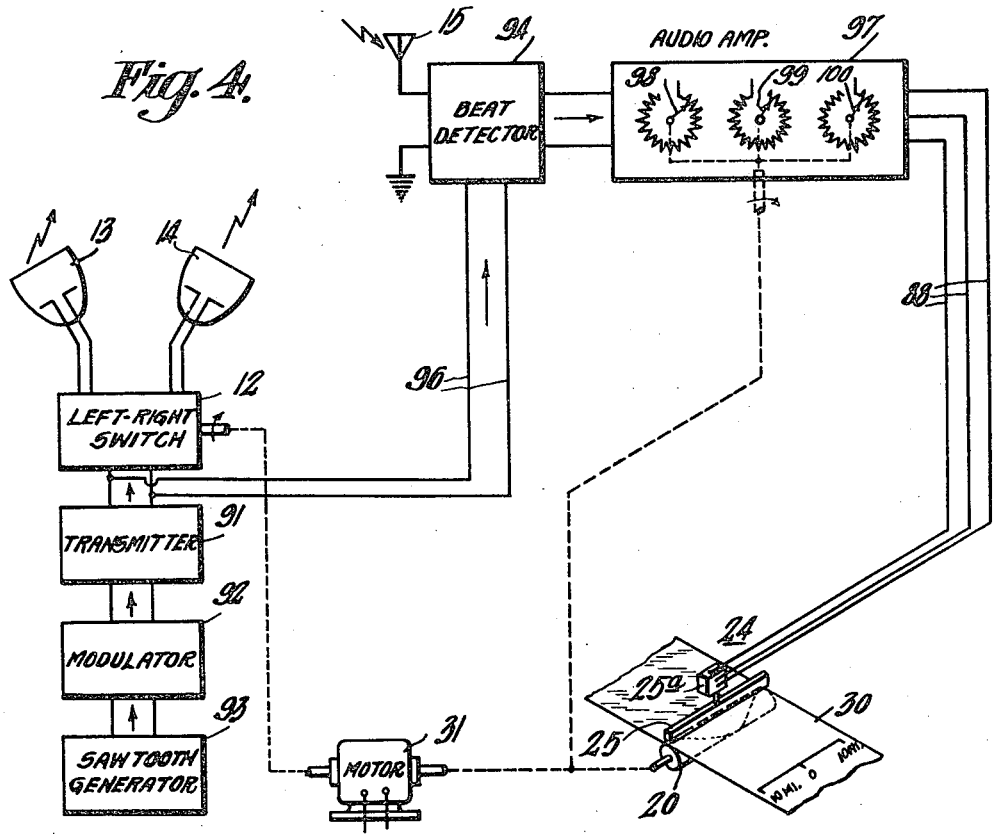
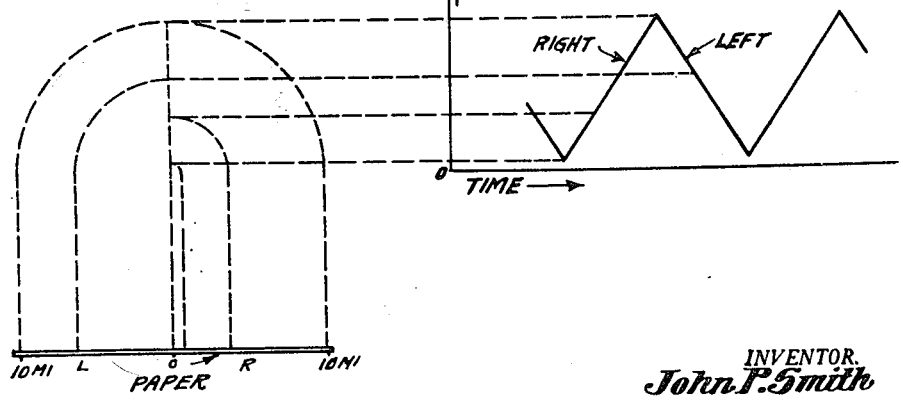
INVENTOR.
John P. Smith
BY
*C.D. Tuska*
ATTORNEY Dec. 20, 1949   J. P. SMITH   2,492,120
RADIO DIRECTION AND RANGING SYSTEM
Filed April 23, 1945   4 Sheets-Sheet 4
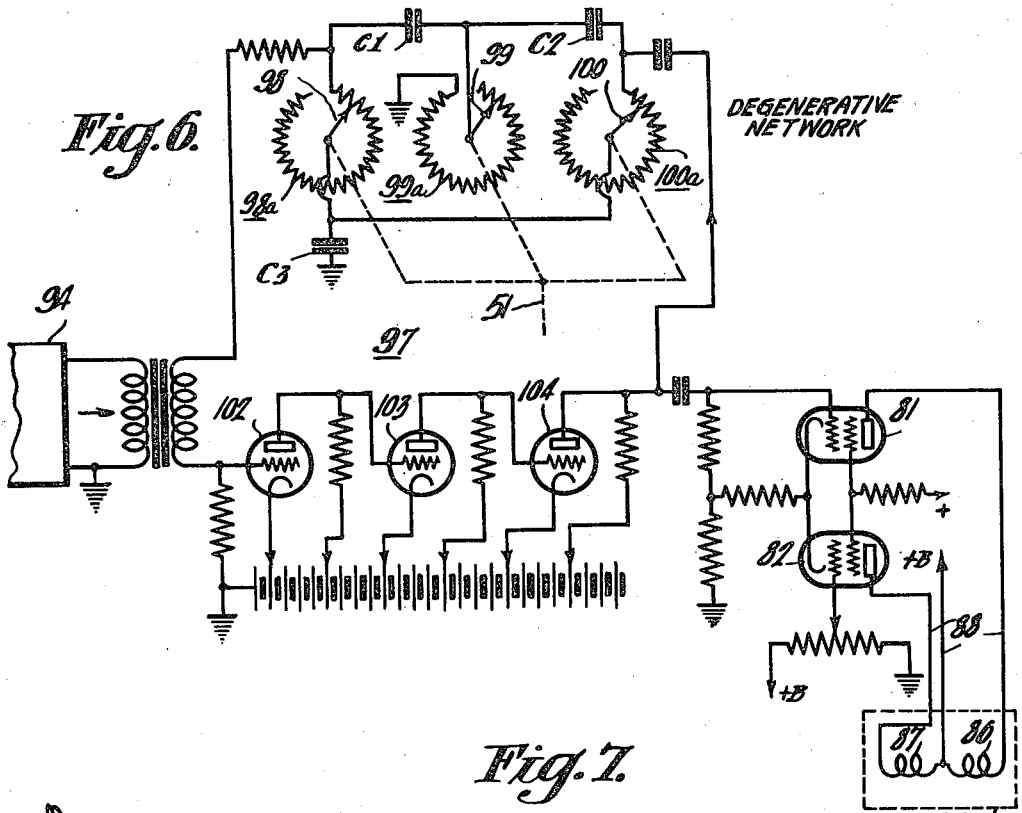
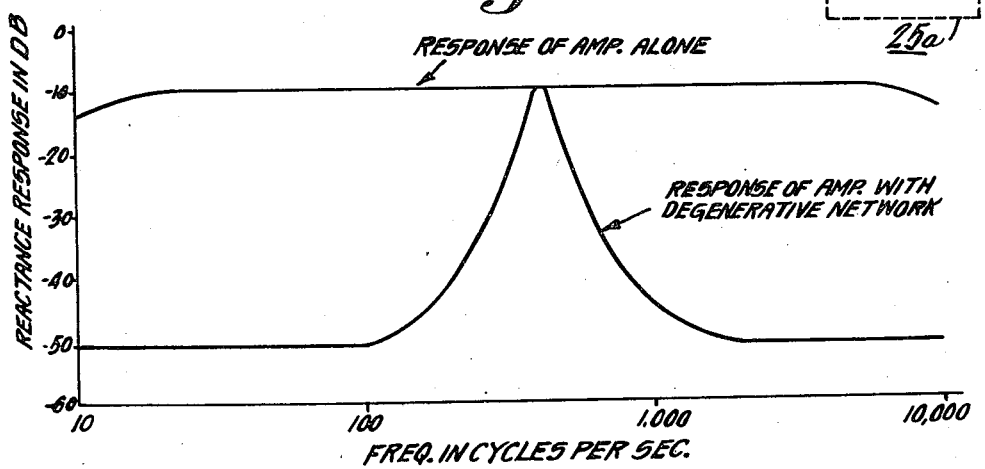
INVENTOR.
John P. Smith
BY
ATTORNEY Patented Dec. 20, 1949

2,492,120

UNITED STATES PATENT OFFICE 2,492,120

RADIO DIRECTION AND RANGING SYSTEM

John P. Smith, Cranbury, N. J., assignor to Radio Corporation of America, a corporation of Delaware Application April 23, 1945, Serial No. 589,924

8 Claims. (Cl. 343—10)

1

My invention relates to radar systems and particularly to systems wherein the reflected signals are recorded by a facsimile recorder or the like.

An object of the invention is to provide an improved method of and means for obtaining a record of the information supplied by a radar system.

A further object of the invention is to provide an improved recording means for a radar system of the type employing directive antennas and left-right or up-down switching thereof.

In a preferred embodiment of the invention the radar system is of the pulse-echo type. A gating pulse which may be shifted along the time axis is applied to an amplifier in the radar receiver. A recorder, which may be of the carbon paper type, is driven so that it scans in synchronism with the timing or phase shift of the gating pulse. The antenna switching also is synchronized with the recorder and the gating pulse.

In another embodiment of the invention the radar system is of the frequency modulated type. In this embodiment the narrow pass band of an audio frequency amplifier in the receiver is shifted in synchronism with the recorder scanning and the antenna switching.

The invention will be better understood from the following description taken in connection with the accompanying drawing in which Figure 1 is a block diagram showing the invention as applied to a pulse-echo radar system, Figure 2 is a group of graphs that are referred to in explaining the operation of the circuit shown in Fig. 1, Figure 3 is a circuit diagram of a portion of the system shown in Fig. 1, Figure 4 is a block diagram of an embodiment of the invention as applied to a frequency-modulated radar system, Figure 5 is a group of graphs that are referred to in explaining the operation of the system shown in Fig. 4, Figure 6 is a circuit diagram of the audio frequency amplifier shown in Fig. 4, and Figure 7 is a graph showing the frequency-response characteristic of the amplifier shown in Fig. 6.

In the several figures, similar parts are indicated by similar reference characters.

Referring to Fig. 1, the invention is applied to a pulse-echo system comprising a radio pulse transmitter 10 that is modulated by periodic electrical pulses supplied from a pulse generator 11. The radio pulses are supplied through suitable switching means, such as a left-right switch 12, alternately to directive antennas 13 and 14. The radiation patterns of the antennas 13 and 14 may be directed forwardly and to the left and right as illustrated, or they may be directed to left and right in exactly opposite directions, for example.

After reflection from a target or other reflecting surface, the radio pulses are picked up by a receiving antenna 15 and supplied to a receiver which may be of the superheterodyne type comprising a first detector, a tunable oscillator and an I.-F. amplifier indicated at 16, a second detector 17, and a video frequency amplifier 19. A clipping circuit 18 preferably precedes the amplifier 19. The receiving apparatus further comprises a gating circuit and an amplifier indicated at 21, an integration circuit 22, a push-pull amplifier 23 and a recorder 24. The recorder may be of the well known carbon paper type having a scanning drum 20 and a printer bar 25 between which the recording paper 30 is fed. In order to simplify the drawing the carbon paper is not shown. The printer bar 25 is actuated by a driving mechanism 25a.

The gating circuit 21 has a gating pulse 26 applied thereto from a gate pulse and phase shift circuit 27. The gating pulse 26 is synchronized with the transmitted pulse by a connection 28 which supplies pulses from the generator 11 to the gate pulse circuit 27. The timing of the pulse 26 with respect to the transmitted pulse is shifted in synchronism with the stylus or scanning drum movement of the recorder 24 by means of a motor 31 which rotates a capacitor 41 in the gate pulse circuit and which also drives the scanning drum 20 of the recorder 24. The motor 31 also operates the antenna switch 12 in a predetermined time relation with respect to the phasing of the gate pulse and the scanning of the recorder.

Fig. 2 illustrates the sequence of operation and the timing relations of the various units in Fig. 1. The graph 34 shows that when the right antenna 14 is first switched to the transmitter 10, the time interval between the transmitted pulse and the gate pulse 26 is a minimum, and the distance of the recorder stylus or contact point from the center of the recording paper 30 is also a minimum. During the period that the right antenna 14 is radiating signal the gate pulse 26 is shifted in timing or phase to increase said time interval to a maximum at the end of the "right" switching period, and at the same time the recorder contact point from the center of the paper 30 to the right edge of the paper.

Next, the left antenna 13 is switched to the transmitter 10 and the gate pulse 26 is now shifted in timing toward the transmitted pulse thus gradually decreasing said time interval to its minimum value, and at the same time the recorder contact point is moved from the left edge of the paper 30 to the center of the paper. The cycle of operation is now repeated.

Since a reflected signal can pass through the gating circuit 21 only during the time a gating pulse 26 is being applied thereto, a mark will be recorded on the paper 30 at a point on either the right or left distance scale corresponding to the distance to the target, the mark being either to the right or to the left of zero or center on the paper depending upon whether the target is to the right or to the left. In Fig. 2, the broken projection lines show how a mark is made on the paper 30 by reflected pulse occurring at different times and being passed to the recorder by the gating pulse 26.

The width or duration of the gating pulse 26 preferably is sufficient to allow several reflected pulses from a particular target to pass through the gating circuit 21 whereby sufficient signal or energy is obtained to operate the recorder. This and other features of the gating circuit and associated circuit will be more fully explained in connection with Fig. 3.

Referring to Fig. 3, the gate pulse and phase shift circuit 27 includes a multivibrator 36 of conventional design comprising a pair of vacuum tubes 37 and 38 which are cross-coupled plate-to-gride through capacitors 39 and 41. The multivibrator 36 is synchronized with the transmitted radio pulses by applying the modulating pulses from the generator 11 through a differentiating circuit 44, 46 and through a coupling capacitor 47 and a coupling resistor 48. The narrow pulse of the multivibrator output wave 42 may be changed in width either by changing the capacity of capacitor 41 and/or by changing the positive bias of the tube 38, this bias being determined by the setting of the tap 43. Changing either the capacity of 41 or changing said bias changes the timing of the back edge of the narrow pulse of wave 42. In the present example, the said capacity change is employed to obtain the desired cyclic phase or time shift of the gating pulse 26, while the setting of the bias tap 43 is employed to determine the range of distance through which targets will be recorded.

The cyclic phase shift of the gating pulse 26 is obtained by continuously rotating the rotor plate of the capacitor 41, the rotor plate being mechanically coupled to a shaft 51 driven by the motor 31 (Fig. 1). The capacitor 41 may be a substantially straight-line capacitor, the rotor and stator plates each being substantially semicircular.

Referring to the wave shaping circuits that shape the rectangular wave 42 into the gating pulse 26, the wave 42 is passed through a differentiating circuit comprising a capacitor 52 and a resistor 53 in series therewith whereby the wave 54 appears across resistor 53. The polarity of the wave 54 is reversed by an amplifier tube 56 which has an unbypassed resistor 57 in its cathode circuit to provide some degeneration. The reversed polarity wave, indicated at 58, is applied to the grid of an amplifying and clipping tube 59 that passes only the positive pulse portions of the wave 58. The tops of these positive pulses will be flattened off somewhat as a result of the grid of the tube 59 being driven positive and thereby loading the tube input circuit. These clipped positive pulses appear in the output circuit of the tube 59 as the desired gating pulses 26. The amplitude of the pulses 26 may be adjusted by an adjustable tap 61.

The gating pulse 26 is supplied with negative polarity over the conductor 35 to the grid 62 of a vacuum tube 63 in the gating circuit 21. The tube 63 and a vacuum tube 64 have a common plate circuit and function as described hereinafter to pass the video frequency signal (i. e., the reflected pulses) only while the gate pulse 26 is on the grid 62.

The video frequency pulses are supplied with negative polarity from the video frequency amplifier 19 to the grid 66 of the tube 64. A clipping circuit 18 preferably is provided to remove any noise signals that may be present having a polarity opposite that of the video frequency pulses. In the clipping circuit shown, a diode 67 is connected in a conventional manner for passing only the video frequency pulses which are applied to the cathode of the diode 67 with negative polarity, the positive polarity noise signals having no effect on the diode current and, therefore, being clipped off.

Referring more particularly to the gating circuit 21, the tubes 63 and 64 have positive voltage applied to their anodes through a common anode resistor 65. This anode voltage has a low value compared with the value required for normal amplifier operation. The grids of tubes 63 and 64 are biased positively so that, due to the positive grid bias and low anode voltage, the negative video frequency pulses on the grid 66 of tube 64 will cause only a small change in voltage at the anode end of the anode resistor 65. However, during the time a negative gating pulse 26 is being simultaneously applied to the grid 62 of the tube 63, the video frequency pulses on the grid 66 will cause a large change in the voltage at the anode end of resistor 65. Thus, large amplitude video frequency pulses are obtained at the output circuit of tubes 63 and 64 only during the occurrence of the gating pulse 26 whereby only these larger amplitude signals are passed by an amplifier and clipper tube 71. It should be understood that the invention is not limited to the use of this particular type of gating circuit.

In the example being described, a group of six video frequency pulses (indicated at 72, Fig. 1) will be passed by the gating circuit if they are present during the interval that a gating pulse 26 is being applied to the gating circuit. In order to make the group of pulses more effective for operating the recorder, they are applied to the integrating circuit 22 which widens each of the video frequency pulses as indicated at 73, Fig. 1.

The integrating circuit 22 comprises a capacitor 74 connected in series with a diode 76 that is shunted by a resistor 77. Each of the negative video frequency pulses 72 from the amplifier tube 71 causes a pulse of diode current to charge the capacitor 74 quickly, and the charge then leaks off the capacitor 74 comparatively slowly through the resistor 77. Thus, widened video frequency pulses are produced across the resistor 77 and, after being reversed in polarity by an amplifier tube 78, appear as the negative pulses 73 (Fig. 1). The pulses 73 are then applied to the grid 79 of an amplifier tube 81 in the push-pull amplifier 23.

The push-pull amplifier 23 comprises the screen-grid tube 81 and a second screen-grid tube 82. The push-pull circuit is of a well-known type wherein the grid 83 of the tube 82 is held at a fixed potential while its cathode 84 is caused to go more negative when the grid 79 of tube 81 is driven more negative by one of the widened video frequency pulses. The anode circuits of the tubes 81 and 82 include the printer bar driving coils 86 and 87 of the driving unit 25a, the amplified pulses 73 being supplied to the coils 86 and 87 by way of the conductors 88. The inertia of the printer bar 25 and the driving mechanism 25a provides a mechanical filtering action for the amplified pulses 73 so that the group of six pulses 73 produce a single mark on the recorder paper 30 rather than six separate marks or dots.

The marking or record on the paper 30 in Fig. 1 illustrates the results that may be obtained by employing my system installed in an airplane for strip mapping of a coast line. In this example, it is assumed that the antennas 13 and 14 are mounted on opposite sides of the airplane and pointing in opposite directions, and that the airplane is travelling along the coast with the shore line at its left.

Fig. 4 shows the invention applied to a radar system of the frequency-modulated type which comprises a radio transmitter 91 that is a cyclically frequency modulated by means of a modulator 92 to which is applied a modulating sawtooth wave supplied from a sawtooth wave generator 93.

The frequency-modulated radio wave is radiated alternately from the directive antennas 13 and 14 pointing toward the left and toward the right, respectively. The radiated wave, after reflection from a target or other reflecting surface, is picked up by the receiving antenna 15 and supplied to a beat frequency detector 94. Frequency-modulated signal is also supplied to the detector 94 directly from the transmitter 91 over a line 96 whereby a beat frequency signal is obtained, the frequency of which is a measure of the distance to the reflecting target.

The beat frequency signal from detector 94 is supplied to an audio frequency amplifier 97 that has a very narrow pass band so that it will pass only the beat frequency signal from one target at a time and supply it to the recorder 24. Means is provided for shifting the said pass band cyclically from the minimum beat frequency to the maximum beat frequency in the operating range. This is done by mechanically coupling the motor 31 to the rotatable arms 98, 99 and 100 of a resistor-capacitor network, this network being frequency selective as described hereinafter in connection with Figs. 6 and 7.

The scanning drum 20 is rotated by the motor 31 in synchronism with the shifting of the band pass characteristic of the amplifier 97. This operation is illustrated in Fig. 5 and corresponds to the scanning drum and gating pulse operation previously described with reference to Fig. 1. It will be seen that the pass band of amplifier 97 is shifted in the direction to pass higher beat frequencies as the contact point of the scanning drum and printer bar moves from the center to the right edge of the paper 30, and then is shifted back in the direction to pass lower beat frequencies as said contact point moves from the left edge of the paper to the center.

Fig. 6 shows merely by way of example one suitable circuit for the amplifier 97. This circuit is described in Terman's Radio Engineers Handbook, page 945. It comprises amplifier tubes 102, 103 and 104 connected to form a direct-current amplifier. A degenerative feed-back connection includes a parallel-T null network, one T section consisting of the capacitors C1 and C2 and the resistor 98a, the other T section consisting of the resistors 98a and 100a and the capacitor C3. The frequency response characteristic of the amplifier is shown in Fig. 7, this characteristic being due to the fact that at the null frequency there is no degenerative feedback and the amplifier operates at full gain. It will be apparent that the mid-frequency of the response curve may be shifted by rotating the resistor arms 98, 99 and 100 to obtain the desired gating operation whereby a record of the type previously described is obtained.

In the drawing various circuit values have been indicated, merely by way of example, in ohms, thousands of ohms and megohms, and in microfarads and micro-microfarads.

I claim as my invention:

1. In combination, a radio locator system comprising means for radiating radio signals to a reflecting object and means for receiving said signals after reflection from said object, gating means for making said receiving means pass only the signals reflected from an object a predetermined distance from said radar system, recording apparatus which includes means for scanning a recording surface by a recording contact point, and means for operating said gating means and said recorder scanning means in synchronism.

2. A radio locator system comprising means for transmitting a periodically modulated radio wave toward a reflecting object, a radio receiver for receiving the wave reflected from said object, gating means for making said receiver pass successively only the received waves that are reflected from objects that are located different predetermined distances from said system, a recorder comprising means for scanning a recording surface at a slow rate compared with said periodic modulation by a recording contact point, means for causing said recorder to make a mark on said surface at the position of said contact point in response to signal passed by said receiver, and means for synchronizing the operation of said gating means and said recorder scanning.

3. A radio locator system comprising means for transmitting a periodically modulated radio wave toward a reflecting object, a radio receiver for receiving the wave reflected from said object, means for producing a gating pulse that recurs at the rate of said periodic modulation and means for shifting the timing or phase of said gating pulse with respect to said periodic modulation at a slow rate compared with said periodic modulation for making said system pass only the received waves that are reflected from an object a predetermined distance from said system, a recorder comprising means for scanning a recording surface at said slow rate by a recording contact point, means for causing said recorder to make a mark on said surface at the position of said contact point in response to signal passed by said receiver, and means for synchronizing said recorder scanning with the phase shift of said gating pulse.

4. A recording system comprising an antenna system for radiating to the left and to the right, means including said antenna system for transmitting a periodically modulated radio wave to the left and to the right toward reflecting objects and for receiving alternately from the left and from the right the waves reflected from said objects, gating means for making said system pass successively only the received signals that are reflected from objects that are located different predetermined distances from said system, a recorder comprising means for scanning a recording surface at a slow rate compared with said periodic modulation by a recording contact point, means for causing said recorder to make a mark on said surface at the position of said contact point in response to reflected signals passed by said system, means for causing said recorder scanning means to scan said recording surface alternately to the left and to the right from its center at said comparatively slow rate and in synchronism with said alternate left-right antenna switching, and means for synchronizing the operation of said gating means and said recorder scanning.

5. A recording system comprising an antenna system for radiating to the left and to the right, means including said antenna system for transmitting a periodically modulated radio wave to the left and to the right toward reflecting objects and for receiving alternately from the left and from the right the waves reflected from said objects, means for producing a gating pulse that recurs at the rate of said periodic modulation and means for shifting the timing or phase of said gating pulse with respect to said periodic modulation for making said system pass only the received signals that are reflected from an object a predetermined distance from said system, a recorder comprising means for scanning a recording surface by a recording contact point, means for causing said recorder to make a mark on said surface at the position of said contact point in response to the reception of the reflected signals during the occurrence of a gating pulse, means for causing said recorder scanning means to scan said recording surface alternately to the left and to the right from its center at a comparatively slow rate and in synchronism with said alternate left-right antenna switching, and means for synchronizing said recorder scanning with the phase shift of said gating pulse.

6. In combination, a pulse-echo radio locator system comprising means for radiating toward a reflecting object a radio pulse that recurs at a certain periodic rate and means for receiving said pulse after reflection from said object, means for producing a gating pulse that recurs at said periodic rate and which is adjustable in timing with respect to the radiated pulse, recording apparatus comprising scanning means for moving a recording contact point along a recording surface, and means for shifting in synchronism said timing of the gating pulse and said movement of the recording contact point.

7. In combination, a pulse-echo radio locator system comprising means for radiating toward a reflecting object a radio pulse that recurs at a certain periodic rate and means for receiving said pulse after reflection from said object, means for producing a gating pulse that recurs at said periodic rate and which is adjustable in timing with respect to the radiated pulse, recording apparatus comprising scanning means for moving a recording contact point along a recording surface, means for gradually increasing the time interval between the radiated pulse and the gating pulse while said recording contact point is being moved from the center of the recording surface to one edge thereof, and means for gradually decreasing said time interval while said contact point is being moved from the other edge of the recording surface to said center.

8. A radio locator system comprising means for transmitting toward a reflecting object a frequency modulated radio wave that is cyclically modulated at a certain rate, a radio receiver including a beat frequency detector for receiving the wave reflected from said object, means for supplying frequency modulated signal directly from said transmitting means to said detector, an audio frequency amplifier having a narrow frequency pass band, means for supplying the output of said detector to said amplifier, means for shifting said pass band at a slow rate compared with said cyclic modulation for making said receiver pass successively only the received waves that are reflected from objects located at predetermined distances from said system, a recorder comprising means for scanning a recording surface at said slow rate by a recording contact point, means for causing said recorder to make a mark on said surface at the position of said contact point in response to signal passed by said amplifier, and means for synchronizing said recorder scanning with the shifting of said pass band.

JOHN P. SMITH.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 2,326,880 | Norrman | Aug. 17, 1943 |
| 2,415,981 | Wolff | Feb. 18, 1947 |

FOREIGN PATENTS

| Number | Country | Date |
| --- | --- | --- |
| 542,634 | Great Britain | Jan. 21, 1942 |